US008928488B2

(12) United States Patent
Rodney et al.

(10) Patent No.: US 8,928,488 B2
(45) Date of Patent: Jan. 6, 2015

(54) SIGNAL PROPAGATION ACROSS GAPS (75) Inventors: Paul F. Rodney, Spring, TX (US); Clive D. Menezes, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 13/132,531

(22) PCT Filed: Oct. 20, 2009

(86) PCT No.: PCT/US2009/061336
§ 371 (c)(1),
(2), (4) Date: Jun. 28, 2011

(87) PCT Pub. No.: WO2010/065205
PCT Pub. Date: Jun. 10, 2010

(65) Prior Publication Data
US 2011/0247803 A1    Oct. 13, 2011

Related U.S. Application Data (60) Provisional application No. 61/119,519, filed on Dec. 3, 2008.

(51) Int. Cl.
*G01V 3/00* (2006.01)
*G01V 1/00* (2006.01)
*G01V 11/00* (2006.01)

(52) U.S. Cl.
CPC .................................. *G01V 11/002* (2013.01)
USPC .............. 340/855.1; 340/854.4; 340/855.2; 340/854.6; 367/25; 367/35; 324/366

(58) Field of Classification Search
USPC ............ 340/853.1–856.3; 367/25–35, 37–82; 175/40–50; 166/250.1, 254.2–255.3; 702/109–115, 122, 124–126, 182–183, 702/189–199; 326/20–50; 324/323–375
See application file for complete search history.

(56) References Cited

U.S. PATENT DOCUMENTS 4,691,203 A    9/1987    Rubin et al.
4,739,325 A    4/1988    MacLeod
(Continued)

FOREIGN PATENT DOCUMENTS

CN      102239430 A      11/2011
TZ         5883516        3/1999
WO    WO-2010065205 A1   6/2010

OTHER PUBLICATIONS

Nannapaneni Narayana Roa, Elements of Engineering Electromagnetics, 1994, Fourth Edition, pp. 393-459.*

(Continued)

*Primary Examiner* — Mohammad Ghayour
*Assistant Examiner* — Jerold Murphy
(74) *Attorney, Agent, or Firm* — Schwegman Lundberg & Woessner, P.A.; Jennifer Trillsch (57) ABSTRACT In some embodiments, an apparatus and a system, as well as a method and an article, may operate to monitor a first condition associated with transmitting or receiving a signal in a formation or on a drill string, or both, over a first selected interval of a drill string located down hole; to monitor a second condition associated with transmitting or receiving the signal in the formation or on the drill string or both, over a second selected interval of the drill string; to compare the first condition to the second condition to provide a comparison result; and based on the comparison result, to select one of the first selected interval or the second selected interval to transmit or receive the signal in the formation or on the drill string, or both. Additional apparatus, systems, and methods are disclosed.

28 Claims, 5 Drawing Sheets

(56) References Cited

U.S. PATENT DOCUMENTS

| | | | |
|---|---|---|---|
| 4,839,644 | A | 6/1989 | Safinya et al. |
| 5,883,516 | A | 3/1999 | Van Steenwyk et al. |
| 6,144,316 | A * | 11/2000 | Skinner ................... 340/853.7 |
| 6,396,276 | B1 * | 5/2002 | Van Steenwyk et al. ..... 324/366 |
| 7,649,474 | B1 | 1/2010 | Gard |
| 2003/0102980 | A1 | 6/2003 | Koro |

OTHER PUBLICATIONS

"Australian Application Serial No. 2009322864, Office Action mailed Mar. 5, 2012", 1 pg.

"Australian Application Serial No. 2009322864, Response filed May 4, 2012 to Examiners Report mailed Mar. 2, 2012", 9 pgs.

"International Application Serial No. PCT/US2009/061336, Search Report mailed Dec. 7, 2009", 4 pgs.

"International Application Serial No. PCT/US2009/061336, Written Opinion mailed Dec. 7, 2009", 9 Pgs.

"nternational Application Serial No. PCT/US2009/061336, International Preliminary Report on Patentability mailed Sep. 30, 2010", 7.

"United Kingdom Application Serial No. 1110144.1, Examiner Report mailed Oct. 26, 2012", 2 pgs.

"Chinese Application Serial No. 200980149047.1, Office Action mailed Feb. 5, 2013", (with English Translation), 9 pgs.

"Chinese Application Serial No. 200980149047.1, Office Action mailed Oct. 25, 2013", 14 pgs.

"Gulf Cooperation Council Application Serial No. 2009/14788, First Examination Report mailed Jul. 14, 2013", 4 pgs.

"Chinese Application Serial No. 200980149047.1, Office Action mailed May 14, 2014", (w/ English Translation), 14 pgs.

* cited by examiner

SIGNAL PROPAGATION ACROSS GAPS

RELATED APPLICATION

This patent application is a nationalization under 35 U.S.C. 371 of PCT/US2009/061336, filed Oct. 20, 2009, and published as WO 2010/065205 A1 on Jun. 10, 2010; which claimed priority under 35 U.S.C. 119(e) to U.S. Provisional Patent Application Ser. No. 61/119,519, filed Dec. 3, 2008; which applications and publication are incorporated herein by reference in their entirety.

BACKGROUND

Various schemes exist for the connection of tubular members, such as pipe sections, including pre-wired sections of drill pipe, to propagate electromagnetic signals. Some of these make use of conduction, and others make use of induction. Some make use of telemetry across nonconductive gaps between the pipe sections.

DETAILED DESCRIPTION

The environment in which various embodiments are used includes offshore wells, with boreholes in conductive formations and 20,000 ft or more of casing. As electromagnetic (EM) signals propagate along the distance of the casing, from down hole to the surface, or in the reverse direction, EM telemetry repeaters can be used to provide signal boost capability to maintain the fidelity of the signal across large distances. Data rates vary from about 2-5 bit/s, on up to about 30-50 bit/s. The repeaters may be spaced about 5000 feet apart. Simplex and duplex repeater designs may be used.

The use of repeaters raises some general design considerations beyond the design of the repeater itself. Specifically, the signaling method should be chosen to prevent increases in latency and decreases in the data rate. For example, pulse modulation may be impractical in some cases. Single sideband modulation may facilitate frequency multiplexing, but may suffer from amplitude variations that impose demanding performance requirements on receivers and amplifiers. On the other hand, phase or frequency modulation with a relatively constant envelope amplitude may be a useful mechanism for signal propagation.

To reduce the use of repeaters, direct electrical contact with the casing may be established and maintained (e.g., using brushes or rollers). In this case, signal attenuation may be substantially reduced. That is, when the casing is driven directly relative to the drill string.

In some cases, the EM signals propagate across gaps in the drill string pipe sections. Repeaters may be used to boost the signal before or after crossing individual gaps.

As gaps in the drill string pass out of the casing into the open borehole, they sometimes experience a "dead zone" in which received or transmitted signals are highly attenuated. The dead-zone extends for approximately 6 meters from the end of the casing in some instances. Attenuation by the dead-zone can be avoided in many embodiments by providing multiple gaps spaced at least 6 meters apart that permit the associated repeater to select a gap that provides the strongest signal, i.e., not a gap that is positioned within the dead-zone. In this manner, continuous system operation can be maintained. Moreover, if one gap fails electrically, the other gap(s) can be used for signaling.

Figure 1:
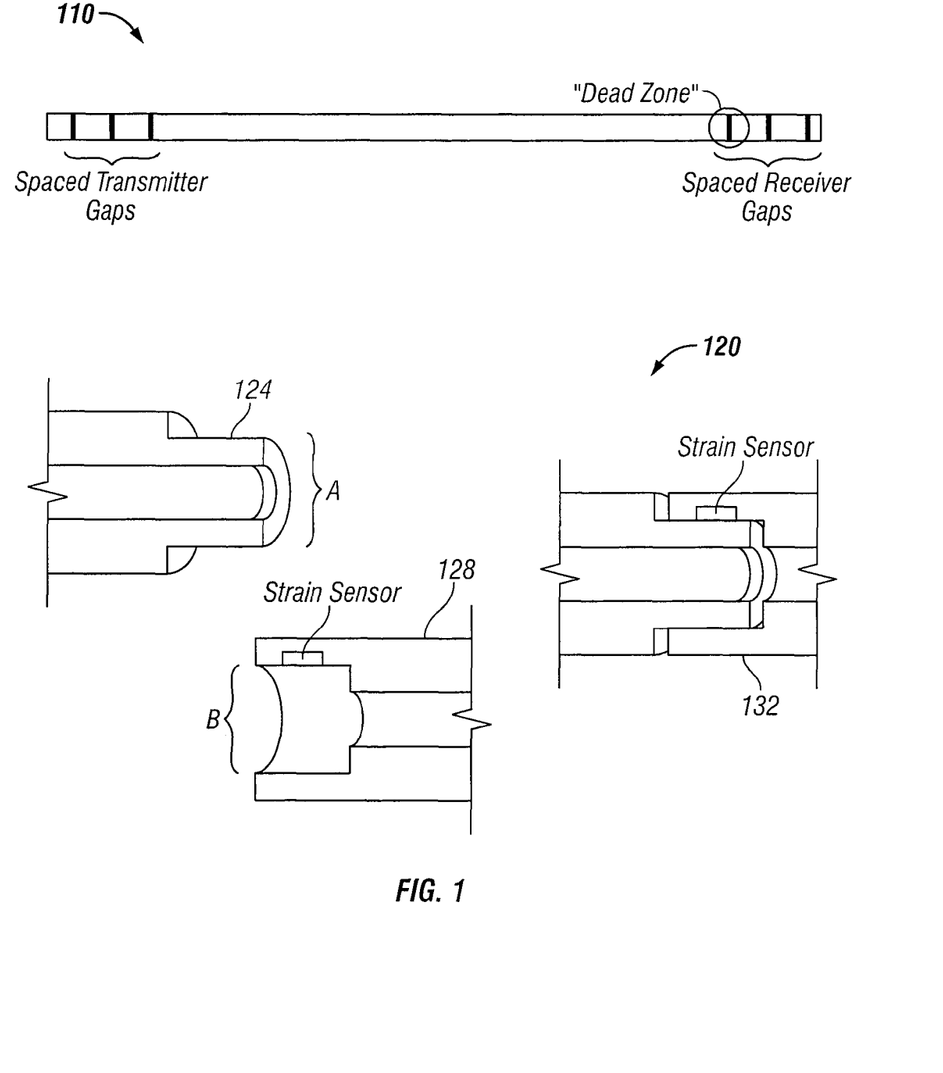
FIG. 1 illustrates spaced gaps and gap condition sensing according to various embodiments of the invention.

FIG. 1 illustrates spaced gaps and gap condition sensing according to various embodiments of the invention. The drill string 110 shows spaced apart EM signal transmitter gaps, and spaced apart EM signal receiver gaps, located on opposing ends of the drill string 110. Thus, the use of multiple, selectable gaps addresses propagation across gaps as the drill string moves through the dead zone, and provides redundancy for electrical gap failures. Thus, in some embodiments of EM tools, redundant switchable gaps can be used in place of an electrically-failed gap.

Therefore, in order to provide a more reliable mechanism for conducting electrical current and signals between sections of pipe and other tubular members, many of the embodiments disclosed herein provide selection of nonconductive gaps (e.g., between drill pipe sections as the gaps pass out of the casing into an open borehole). The selection of the gaps may occur by selecting EM telemetry repeaters used to propagate signals across the gaps.

Figure 2:
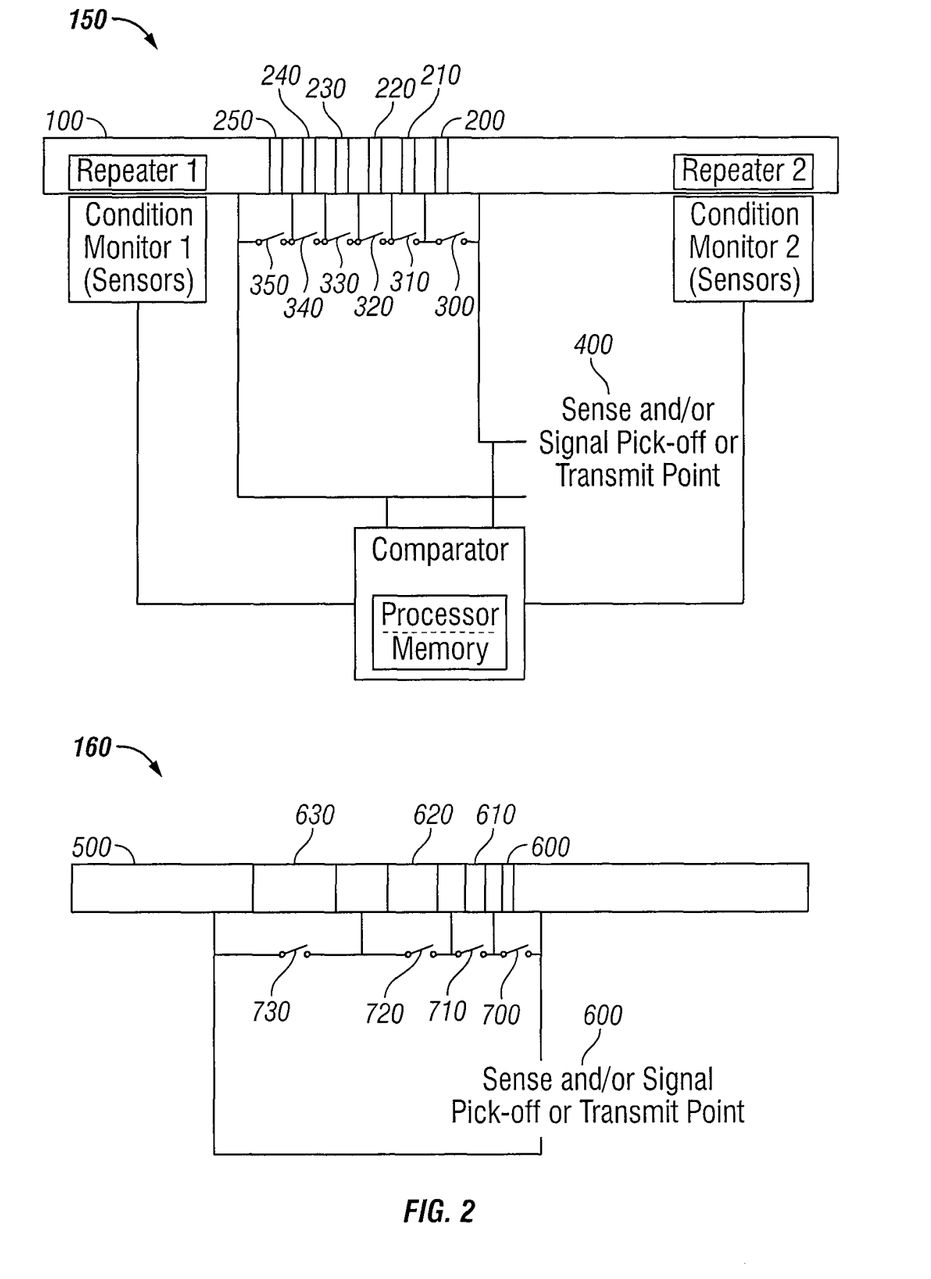
FIG. 2 illustrates various gap selection arrangements, according to various embodiments of the invention.

A number of repeater design configurations can be considered. In one embodiment, the repeater module includes two widely-separated sets of gaps (100-300 ft apart). Each gap includes a non-conducting material to break the electrical connection between conducting tubular segments above and below the gap. To make the gaps electrically switchable; a relay or other form of switch can be used to electrically "short" unselected gaps, while the switch associated with the selected gap remains open. The apparatus 150 shown in FIG. 2 illustrates this type of gap selection. Sometimes multiple gaps are selected to conserve power, perhaps by using fewer repeaters.

In some embodiments, gaps of different widths can be chosen and/or multiple, relatively-closely spaced gaps can be selected so as to provide effectively wider gaps. For example, as shown in drill string 150, drill collar 100 has a plurality of insulating gaps 200, 210, 220, 230, 240, 250. The plurality of gaps are switched in or out by at least one switch (e.g., switches 300, 310, 320, 330, 340, 350). When all of the switches are closed, then all of the gaps are short circuited and the transmitter/receiver associated with the gaps is effectively removed from the system. This can be useful when it is desirable to eliminate a temporarily unnecessary repeater from the system.

As zones of differing resistivity are penetrated by the drill string 150, or as the drill string 150 emerges from casing, fewer repeaters may be used (as might be employed at other depths). Shorting all of the gaps is also a mechanism for selecting between different repeaters.

For example, when all but switch 300 is closed, gap 200 is active. If, instead switch 310 is also open, then gaps 200 and 210 act in series to make a larger effective gap. Note that it is also possible to have switches 300 and 340 open while switches 310, 320, 330 and 350 are closed. In this case, gaps 200 and 240 are effectively added in series. This may be advantageous when trying to detect or launch a signal when within casing. Still wider effective gaps can be achieved by leaving more switches open. In each case, the signal received across the open gaps (or developed across the open gaps) appears at port 400.

One or more gaps may be selected in a similar manner with respect to the drill string 160 of FIG. 2. In this case, one or more of the selected gaps may have a width that is different from one, some, or all of the other gaps. That is, the gaps 600, 610, 620, and 630 may all be of different widths, perhaps designed to have an arithmetic, squared or logarithmic progression of width to enable selecting a variety of progressively greater cumulative gap distances. In the case of drill strings 150 and 160, relays can be used to switchably select gaps.

EM signals can be detected by the voltage difference across a selected gap, and EM signals can be generated by driving a voltage difference across the selected gap. In a full simplex system or duplex system, one gap can be used for receiving, and another gap can be used for transmitting (preferably with a different carrier frequency). A cable or wired drill pipe configuration is used to cover the distance between the sets of gaps. Alternatively, a "short-hop" communications link may be used to cover the distance. One proposed short-hop technique employs toroids for inducing current in the drill string. Another repeater design employs a toroid as the primary mechanism for receiving and re-transmitting (possibly using different or selectable windings).

In many embodiments, the majority of the gap impedance is resistive, with a lesser inductive component. Changes in the surface configuration can be observable as changes in the gap impedance. Gaps may be coated with nonconductive materials.

The gaps in an EM Telemetry repeater can represent structural weak points. A gap defines a point in the drill string that prevents axial current flow in the wall of the drill string, or at least greatly reduces the magnitude of the flow. Because steel is relatively conductive, a break in the tubing wall is needed. To provide this break while keeping the structural integrity of the drill string relatively high, an interference-fit can be used as shown in the figure (see FIG. 1, assembly 132). The male part (pin 124) of section A is coated with a thin insulating layer, and the diameter is slightly greater than the diameter of the cavity (box 128) of section B in the female part of the connection. The female part is heated to expand the cavity diameter enough to accommodate the cold male part, the two parts are quickly fitted together, and the female part allowed to cool. In the resulting connection, a high frictional force results from the tight fit. To expand the effective size of the insulating layer, an outer sleeve of insulating material may be placed over the joint.

The insulating layer is highly compressed between the sections A and B, and as the joint in the assembly 132 undergoes stress loading and thermal cycling from the drilling process, the insulating layer may degrade, eventually allowing current to flow across the connection. Though the gap impedance can be electrically monitored by the transmitter or receiver electronics, the electrical failure may be quite sudden and unpredictable.

Therefore, many embodiments of the invention provide mechanical stress sensors to detect the stresses applied to the joint during run-in and drilling processes. The tool electronics can monitor the stress history and predict a remaining-life-to-failure for the gaps in the repeater. The stress history, when combined with thermal cycling history, can provide a more accurate remaining lifetime predictor than the gap impedance alone. When the remaining lifetime prediction falls below a threshold value, the system can operate to indicate that replacement of the repeater should be performed at the next opportunity. Gap stress sensors will thus enable more robust telemetry system performance by reducing the opportunities for unattended component failure.

For example, in some embodiments, a self-monitoring mechanism that monitors the health of the gaps across which EM signals propagate can offer a number of benefits, including those cases where detachment of the bottom hole assembly is a concern. For example, strain gauges may be used to monitor gap health, perhaps with greater sensitivity than more conventional impedance monitoring. As shown in FIG. 1, strain sensors may be embedded in sections of the drill string elements 120, including in the pin 124 (not shown) or box 128 (shown) of the drill string assembly 132 as it operates with the two sections A and B of the drill string assembly 132 fitted together. In some embodiments, monitoring the strain in the drill string proximate to the gap may be used in conjunction with gap impedance monitoring to determine gap health. Using integrated gap stress sensors, the stress history and thermal cycling history of each gap can be monitored to predict the remaining useful life of each repeater, perhaps leading to increased operational reliability.

EM telemetry repeaters having narrow gaps may offer improved performance. Narrow gaps are less prone to mechanical failure and easier to construct. A small space-savings is also expected due to the use of narrow gaps. Narrow gaps are gaps between drill pipe sections on the order of 10 mm or less, and appear to operate based on the dissipative wave-guide behavior of the system, particularly in highly conductive formations such as those observed below the sea floor.

Figure 3:
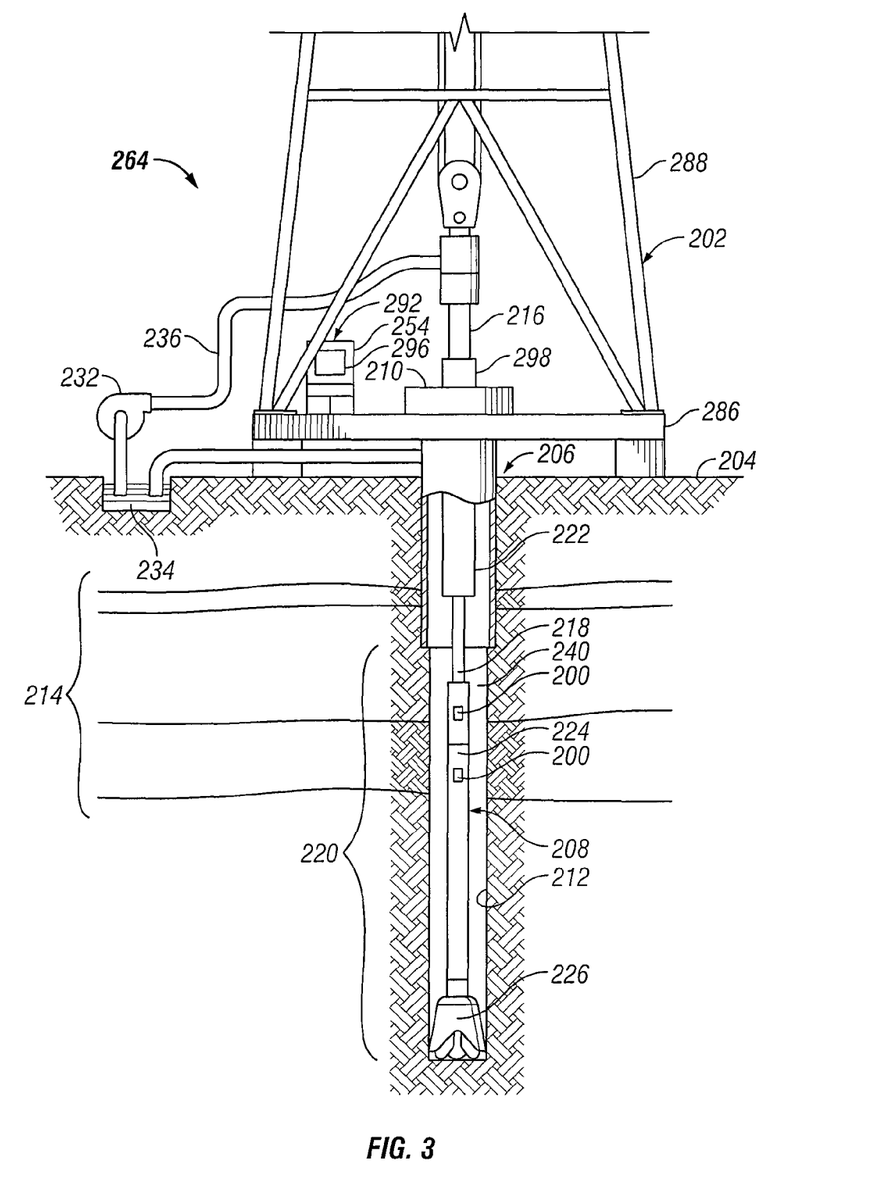
FIG. 3 illustrates apparatus and systems according to various embodiments of the invention.

FIG. 3 illustrates apparatus 200 and systems 264 according to various embodiments of the invention. The apparatus 200, which may be similar to or identical to the apparatus 110, 120, 150, and 160 described above and shown in FIGS. 1 and 2, may comprise portions of a drill string 208 as part of a down hole drilling operation.

For example, it can be seen how a system 264 may form a portion of a drilling rig 202 located at a surface 204 of a well 206. The drilling rig 202 may provide support for a drill string 208. The drill string 208 may operate to penetrate a rotary table 210 for drilling a borehole 212 through subsurface formations 214. The drill string 208 may include a Kelly 216, drill pipe 218, and a bottom hole assembly 220, perhaps located at the lower portion of the drill pipe 218. The drill string 208 may include wired and unwired drill pipe, as well as wired and unwired coiled tubing, including segmented drill pipe, casing, and coiled tubing.

The bottom hole assembly 220 may include drill collars 222, a down hole tool 224, and a drill bit 226. The drill bit 226 may operate to create a borehole 212 by penetrating the surface 204 and subsurface formations 214. The down hole tool 224 may comprise any of a number of different types of tools including measurement while drilling (MWD) tools, logging while drilling (LWD) tools, and others.

During drilling operations, the drill string 208 (perhaps including the Kelly 216, the drill pipe 218, and the bottom hole assembly 220) may be rotated by the rotary table 210. In addition to, or alternatively, the bottom hole assembly 220 may also be rotated by a motor (e.g., a mud motor) that is located down hole. The drill collars 222 may be used to add weight to the drill bit 226. The drill collars 222 also may stiffen the bottom hole assembly 220 to allow the bottom hole assembly 220 to transfer the added weight to the drill bit 226, and in turn, assist the drill bit 226 in penetrating the surface 204 and subsurface formations 214.

During drilling operations, a mud pump 232 may pump drilling fluid (sometimes known by those of skill in the art as "drilling mud") from a mud pit 234 through a hose 236 into the drill pipe 218 and down to the drill bit 226. The drilling fluid can flow out from the drill bit 226 and be returned to the surface 204 through an annular area 240 between the drill pipe 218 and the sides of the borehole 212. The drilling fluid may then be returned to the mud pit 234, where such fluid is filtered. In some embodiments, the drilling fluid can be used to cool the drill bit 226, as well as to provide lubrication for the drill bit 226 during drilling operations. Additionally, the drilling fluid may be used to remove subsurface formation 214 cuttings created by operating the drill bit 226.

Thus, referring now to FIGS. 1 and 2, it may be seen that in some embodiments, the system 264 may include a drill collar 222, and/or a down hole tool 224, as well as a drill string 208 to which one or more apparatus 200 are attached. The down hole tool 224 may comprise an LWD tool or MWD tool. The drill string 208 may be mechanically coupled to the down hole tool 224.

In some embodiments then, a system 264, such as a tubular member coupling system with selectable signal propagation gaps and/or repeaters, may include a down hole tool 270 to couple to one or more tubular members (e.g. drill pipe sections 218 may include one or more tubular members) having pin ends, box ends, or a combination of both, to attach to or to include one or more apparatus 200.

All of the elements in all of the figures shown may be characterized as "modules" herein. Such modules may include hardware circuitry, processors, memory circuits, software program modules and objects, and firmware, and combinations thereof, as desired by the architect of the apparatus 110, 120, 150, and 160, 200 and systems 264, and as appropriate for particular implementations of various embodiments. For example, in some embodiments, such modules may be included in an apparatus and/or system operation simulation package, such as a software electrical signal simulation package, an alignment and synchronization simulation package, and/or a combination of software and hardware used to simulate the operation of various potential embodiments.

It should also be understood that the apparatus and systems of various embodiments can be used in applications other than for drilling and logging operations, and thus, various embodiments are not to be so limited. The illustrations of apparatus 110, 120, 150, 160, and 200, and systems 264 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, personal computers, workstations, vehicles, including aircraft and watercraft, as well as cellular telephones, among others. Some embodiments include a number of methods.

Figure 4:
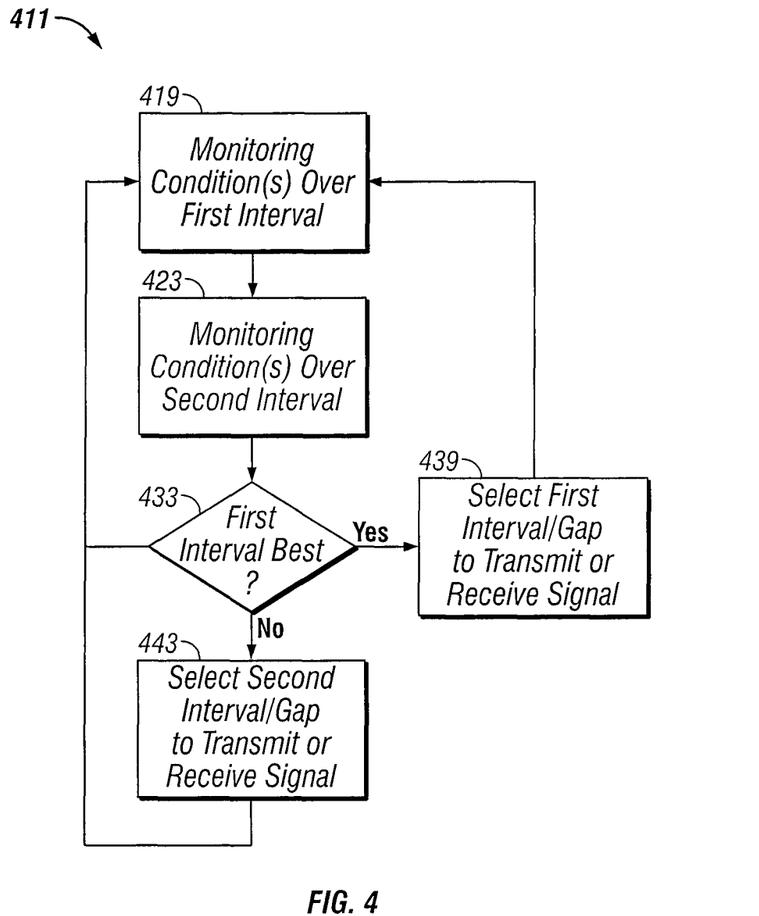
FIG. 4 is a flow chart illustrating several methods according to various embodiments of the invention.

For example, FIG. 4 is a flow chart illustrating several methods 411 according to various embodiments of the invention. In some embodiments, a method 411 may begin at block 419 with monitoring a first condition associated with transmitting or receiving a signal in a formation or on a drill string, or both, over a first selected interval of a drill string located down hole.

The method 411 may continue on to block 423 with monitoring a second condition associated with transmitting or receiving the signal in the formation or on the drill string or both, over a second selected interval of the drill string. Monitored conditions may include joint temperature and cycling history, electrical signal strength, magnetic signal strength, an approximate measurement of mechanical stress or electrical impedance associated with gaps, etc.

The method 411 may then go on to block 433 with comparing the first condition to the second condition to provide a comparison result. The comparison result may be associated with optimizing reception of the signal via maximizing electric and/or magnetic signal strength, or optimizing transmission of the signal via an impedance being driven to transfer a maximum amount of power to the formation, the drill string, or both, excluding a gap impendance.

Based on the comparison result, the method 411 may go on to either block 439 or block 443 by selecting one of the first selected interval or the second selected interval to transmit or receive the signal in the formation or on the drill string, or both. Other methods may be realized.

It should be noted that the methods described herein do not have to be executed in the order described, or in any particular order. Moreover, various activities described with respect to the methods identified herein can be executed in iterative, repetitive, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-oriented format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment.

Figure 5:
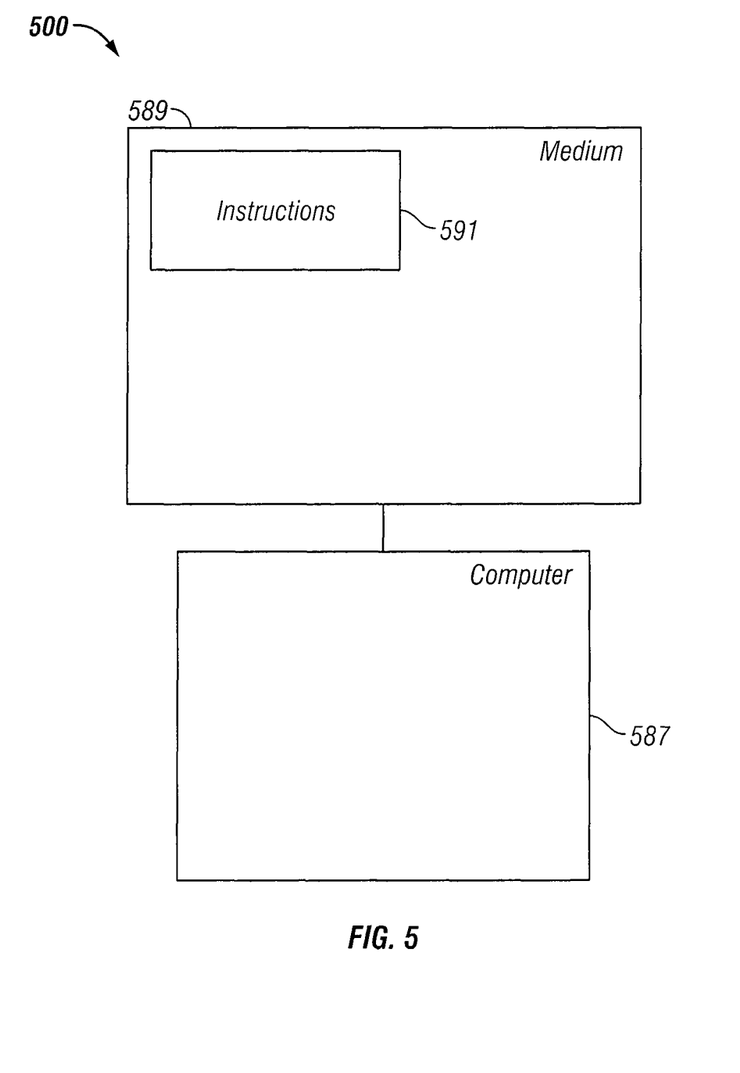
FIG. 5 is a block diagram of an article according to various embodiments of the invention.

Thus, other embodiments may be realized. For example, FIG. 5 is a block diagram of an article 500 according to various embodiments of the invention. In some embodiments, an article 500 may comprise a computer, a memory system, a magnetic or optical disk, some other storage device, and/or any type of electronic device or system. Thus, an article 500 may include a computer 587 coupled to a computer-readable medium 589 such as a memory (e.g., removable storage media, as well as any memory including an electrical, optical, or electromagnetic conductor) having associated information 591 stored thereon (e.g., computer program instructions and/or data), which when executed, result in the computer performing any of the actions described with respect to the methods above.

Many embodiments may thus be realized. For example, in an embodiment, a method comprises monitoring a first condition associated with transmitting or receiving a signal in a formation and/or on a drill string over a first selected interval of a drill string located down hole; monitoring a second condition associated with transmitting or receiving the signal in the formation and/or on the drill string over a second selected interval of the drill string; comparing the first condition to the second condition to provide a comparison result; and based on the comparison result, selecting one of the first selected interval or the second selected interval to transmit or receive the signal in the formation and/or on the drill string.

In some embodiments of the method, the comparison result is associated with at least one of optimizing reception of the signal via maximizing electric and/or magnetic signal strength, or optimizing transmission of the signal via an impedance being driven to transfer a maximum amount of power to the formation, the drill string, or both, excluding a gap impedance. In some embodiments, at least one of the first or the second selected intervals of the drill string contain an electrically insulating gap, and selecting one of the first selected interval or the second selected interval comprises selecting the electrically insulating gap.

In some embodiments of the method, at least one of the first condition or the second condition comprises at least one of an electrical signal strength of the signal or a magnetic signal strength of the signal. In some embodiments, at least one of the first condition or the second condition comprises an approximate measurement of mechanical stress or electrical impedance associated with one of a first gap in the first interval, or a second gap in the second interval, respectively.

Some embodiments of the method comprise receiving logging while drilling data as part of the signal. Some embodiments comprise operating a down hole tool by sending commands to the down hole tool from a surface logging facility via the signal.

Some embodiments of the method comprise selecting a gap in the drill string to propagate the signal from a plurality of gaps of different widths. Some embodiments comprise selecting a plurality of gaps in the drill string to propagate the signal, where a number of the plurality is determined based on an effective combined width of the number of gaps.

In an embodiment, an apparatus comprises a cylinder comprising N sections to be coupled together using N−1 interference fit gaps comprising a first set of gaps and a second set of gaps; at least one electrical switch to switchably select a first gap from the first set of gaps, and to select a second gap from the second set of gaps, the selection of the first gap and the second gap based on comparing a first condition corresponding to propagation conditions associated with propagating a signal across the first gap to a second condition corresponding to propagation conditions associated with propagating the signal across the second gap.

The cylinder may comprise at least one section of prewired drill pipe that includes the conductor. The electrical switch may comprise a relay operable to electrically short at least one of the first set of gaps or the second set of gaps that is not the first gap or the second gap, respectively.

Some embodiments of the apparatus comprise at least one electromagnetic telemetry repeater to transmit or receive the signal across one of the first gap or the second gap. In some embodiments, the apparatus comprises a conductor comprising at least one wire to conduct the signal from the first set of gaps to the second set of gaps.

Some embodiments of the apparatus comprise a wireless communications link to propagate the signal between the first set of gaps and the second set of gaps. Some embodiments comprise an electronic module to determine a result of the comparing and to operate the electric switch. The electronic module may comprise a processor; and a memory to store a program, which when executed, causes the processor to determine the result and to operate the electric switch. Some embodiments comprise a memory; and a processor to store, in the memory, at least one of a stress history, a thermal cycle history, or a gap impedance history associated with at least one of the first gap or the second gap.

Some embodiments of the apparatus comprise one or more sensors to provide a value associated with the first condition or the second condition. The sensors may comprise one or more of an electrical signal strength sensor, a magnetic signal strength sensor, a mechanical strain sensor, an electrical impedance sensor, or a thermal sensor.

In an embodiment, a system comprises a drill string comprising N sections to be coupled together using N−1 interference fit gaps comprising a first set of gaps and a second set of gaps, and at least one electrical switch to switchably select a first gap from the first set of gaps, and to select a second gap from the second set of gaps, the selection of the first gap and the second gap based on comparing a first condition corresponding to propagation conditions associated with propagating a signal across the first gap to a second condition corresponding to propagation conditions associated with propagating the signal across the second gap.

The system may also comprise a down hole tool to couple to the drill string. The down hole tool may comprise an LWD tool.

In some embodiments, the system comprises a surface facility to receive or to transmit the signal. Some embodiments may comprise an electromagnetic repeater attached to the drill string to transmit the signal to the surface facility, or to receive the signal from the surface facility. Some embodiments may comprise a set of toroids to propagate the signal between the first set of gaps and the second set of gaps.

Some embodiments comprise a computer-readable medium having instructions stored thereon which, when executed by a computer, cause the computer to perform a method comprising monitoring a first condition corresponding to propagation conditions associated with propagating a signal across a first gap in a drill string; comparing the first condition to a second condition corresponding to propagation conditions associated with propagating the signal across a second gap in a drill string to provide a comparison result; and selecting one of the first gap or the second gap, based on the comparison result, to serve as a propagation gap for receiving or transmitting the signal.

In some embodiments, the instructions in the computer-readable medium, when executed by the computer, cause the computer to perform a method comprising sequencing electrical shorting connections across a first set of gaps including the first gap; measuring a value of the first condition while all but the first gap of the first set of gaps are shorted; and measuring the value of the first condition while all but another one of the first set of gaps are shorted, including the first gap.

In some embodiments, the instructions in the computer-readable medium, when executed by the computer, cause the computer to perform a method comprising selecting one of the first gap or the second gap based on the comparison result indicating a signal strength associated with the signal.

In some embodiments, the instructions in the computer-readable medium, when executed by the computer, cause the computer to perform a method comprising modulating the signal using a substantially constant envelope phase or frequency modulation technique.

Using the coupling apparatus, systems, and methods disclosed herein may provide improved EM telemetry signal propagation. Reduced system operational cost may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

In this description, numerous specific details such as logic implementations, opcodes, means to specify operands, resource partitioning, sharing, and duplication implementations, types and interrelationships of system components, and logic partitioning/integration choices are set forth in order to provide a more thorough understanding of various embodiments. It will be appreciated, however, by those skilled in the art that embodiments of the invention may be practiced without such specific details. In other instances, control structures, gate level circuits and full software instruction sequences have not been shown in detail so as not to obscure the embodiments of the invention.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   monitoring a first condition of a first selected interval of a drill string located down hole, the first condition associated with one of a signal propagation in a formation, a signal propagation on the drill string, or a signal propagation both in the formation and on the drill string, and associated with a stress monitored by a first strain sensor in the first selected interval
   monitoring a second condition of a second selected interval of the drill string, the second condition associated with the signal propagation associated with the first condition and associated with a stress monitored by a second strain sensor in the second selected interval
   comparing the first condition to the second condition to provide a comparison result; and based on the comparison result, selecting one of the first selected interval or the second selected interval to propagate one of a signal in the formation, a signal on the drill string, or a signal in both the formation and on the drill string.

2. The method of claim 1, wherein the comparison result is associated with at least one of:
   optimizing reception of the signal via one of maximizing electric signal strength, maximizing magnetic signal strength, or maximizing both the electric signal strength and the magnetic signal strength; or
   optimizing transmission of the signal via an impedance being driven to transfer a maximum amount of power to one of the formation, the drill string, or both the formation and the drill string, excluding a gap impedance.

3. The method of claim 1 wherein at least one of the first or the second selected intervals of the drill string contain an electrically insulating gap, and wherein selecting one of the first selected interval or the second selected interval comprises:
   selecting the electrically insulating gap.

4. The method of claim 1, further comprising:
   receiving logging while drilling data as part of the signal.

5. The method of claim 1, further comprising:
   operating a down hole tool by sending commands to the down hole tool from a surface logging facility via the signal.

6. The method of claim 1, further comprising:
   selecting a gap in the drill string to propagate the signal from a plurality of gaps of different widths.

7. The method of claim 1, further comprising:
   selecting a plurality of gaps in the drill string to propagate the signal, where a number of the plurality is determined based on an effective combined width of the number of gaps.

8. An apparatus, comprising:
   a cylinder comprising N sections to be coupled together using N−1 interference fit gaps comprising a first set of gaps and a second set of gaps;
   at least one electrical switch to switchably select a first gap from the first set of gaps, and to select a second gap from the second set of gaps, the selection of the first gap and the second gap based on a comparison of a first condition to a second condition, the first condition being a condition of the first gap, the first condition correlated to propagation conditions associated with propagating a signal across the first gap, and the second condition being a condition of the second gap, the second condition correlated to propagation conditions associated with propagating the signal across the second gap; and
   a strain sensor integrated with each interference fit gap such that the first condition is based on monitored gap stress of the first gap.

9. The apparatus of claim 8, further comprising:
   at least one electromagnetic telemetry repeater to transmit or receive the signal across one of the first gap or the second gap.

10. The apparatus of claim 8, wherein the electrical switch comprises:
    a relay operable to electrically short at least one of the first set of gaps or the second set of gaps that is not the first gap or the second gap, respectively.

11. The apparatus of claim 8, further comprising:
    a conductor comprising at least one wire to conduct the signal from the first set of gaps to the second set of gaps.

12. The apparatus of claim 11, wherein the cylinder comprises:
at least one section of prewired drill pipe that includes the conductor.

13. The apparatus of claim 8, further comprising:
a wireless communications link to propagate the signal between the first set of gaps and the second set of gaps.

14. The apparatus of claim 8, further comprising:
an electronic module to determine a result of the comparing and to operate the electric switch.

15. The apparatus of claim 14, wherein the electronic module comprises:
a processor; and
a memory to store a program, which when executed, causes the processor to determine the result and to operate the electric switch.

16. The apparatus of claim 8, further comprising:
at least one sensor to provide a value associated with the second condition.

17. The apparatus of claim 16, wherein the at least one sensor comprises:
one of an electrical signal strength sensor, a magnetic signal strength sensor, a mechanical strain sensor, an electrical impedance sensor, or a thermal sensor.

18. The apparatus of claim 8, further comprising:
a memory; and
a processor to store, in the memory, at least one of a stress history, a thermal cycle history, or a gap impedance history associated with at least one of the first gap or the second gap.

19. The apparatus of claim 18, wherein the processor is operable to predict a remaining-life-to-failure for gaps in a repeater that includes the first gap.

20. A system, including:
a drill string comprising N sections to be coupled together using N-1 interference fit gaps comprising a first set of gaps and a second set of gaps, and at least one electrical switch to switchably select a first gap from the first set of gaps, and to select a second gap from the second set of gaps, the selection of the first gap and the second gap based a comparison of a first condition to a second condition, the first condition being a condition of the first gap, the first condition correlated to propagation conditions associated with propagating a signal across the first gap and the second condition being a condition of the first gap, the second condition correlated to propagation conditions associated with propagating the signal across the second gap;
a strain sensor integrated with each interference fit gap such that the first condition is based on monitored gap stress of the first gap; and
a down hole tool to couple to the drill string.

21. The system of claim 20, wherein the down hole tool comprises:
a logging while drilling (LWD) tool.

22. The system of claim 20, including:
a surface facility to receive or to transmit the signal.

23. The system of claim 22, further comprising:
an electromagnetic repeater attached to the drill string to transmit the signal to the surface facility, or to receive the signal from the surface facility.

24. The system of claim 20, further comprising:
a set of toroids to propagate the signal between the first set of gaps and the second set of gaps.

25. A computer-readable medium having instructions stored thereon which, when executed by a computer, cause the computer to perform a method comprising:
monitoring a first condition of a first gap in a drill string, the first condition correlated to propagation conditions associated with propagating a signal across the first gap in the drill string, wherein monitoring the first condition of the first gap includes monitoring a first strain sensor disposed in the drill string proximate to the first gap;
monitoring a second condition of a second gap in the drill string, the second condition correlated to propagation conditions associated with propagating the signal across the second gap in the drill string, wherein monitoring the second condition of the second gap includes monitoring a second strain sensor disposed in the drill string proximate to the second gap;
comparing the first condition to the second condition providing a comparison result; and
selecting one of the first gap or the second gap, based on the comparison result, to serve as a propagation gap for receiving or transmitting the signal.

26. The computer-readable medium of claim 25, wherein the instructions, when executed by the computer, cause the computer to perform the method, further comprising:
sequencing electrical shorting connections across a first set of gaps including the first gap;
measuring a value of the first condition while all but the first gap of the first set of gaps are shorted; and
measuring the value of the first condition while all but another one of the first set of gaps are shorted, including the first gap.

27. The computer-readable medium of claim 25, wherein the instructions, when executed by the computer, cause the computer to perform in the method, further comprising:
selecting one of the first gap or the second gap based on the comparison result indicating a signal strength associated with the signal.

28. The computer-readable medium of claim 25, wherein the instructions, when executed by the computer, cause the computer to perform the method, further comprising:
modulating the signal using a substantially constant envelope phase or frequency modulation technique.

* * * * *

UNITED STATES PATENT AND TRADEMARK OFFICE
CERTIFICATE OF CORRECTION

Page 1 of 1

PATENT NO. : 8,928,488 B2
APPLICATION NO. : 13/132531
DATED : January 6, 2015
INVENTOR(S) : Rodney et al.

It is certified that error appears in the above-identified patent and that said Letters Patent is hereby corrected as shown below:

In the claims

In column 9, line 60, in Claim 1, after "interval", insert --;--, therefor

In column 9, line 65, in Claim 1, after "interval", insert --;--, therefor In column 9, line 67, in Claim 1, after "and", insert --¶--, therefor In column 10, line 15, in Claim 3, after "1", insert --,--, therefor In column 12, line 45, in Claim 3, after "perform", delete "in", therefor Signed and Sealed this
Tenth Day of November, 2015

Michelle K. Lee
*Director of the United States Patent and Trademark Office*